United States Patent
Kraemer

(10) Patent No.: US 12,282,537 B2
(45) Date of Patent: Apr. 22, 2025

(54) METHOD AND APPARATUS FOR OPERATING A SECURE DATA COMMUNICATION BETWEEN FUNCTIONAL UNITS FOR A VEHICLE

(71) Applicant: Knorr-Bremse Systeme Fuer Nutzfahrzeuge GmbH, Munich (DE)

(72) Inventor: Christian Kraemer, Knittlingen (DE)

(73) Assignee: KNORR-BREMSE SYSTEME FUER NUTZFAHRZEUGE GMBH, Munich (DE)

(*) Notice: Subject to any disclaimer, the term of this patent is extended or adjusted under 35 U.S.C. 154(b) by 266 days.

(21) Appl. No.: 18/050,443

(22) Filed: Oct. 27, 2022

(65) Prior Publication Data
US 2023/0137404 A1     May 4, 2023

(30) Foreign Application Priority Data
Nov. 2, 2021  (DE) ............ 10 2021 128 434.1

(51) Int. Cl.
*G06F 21/44*   (2013.01)
(52) U.S. Cl.
CPC ................. *G06F 21/44* (2013.01)
(58) Field of Classification Search
USPC ........................................................ 726/18
See application file for complete search history.

(56) References Cited

U.S. PATENT DOCUMENTS

| | | | |
|---|---|---|---|
| 10,218,499 B1* | 2/2019 | El Idrissi | ............ G06F 21/44 |
| 2005/0229254 A1* | 10/2005 | Singh | ............ H04L 63/1416 |
| | | | 726/23 |
| 2009/0210707 A1 | 8/2009 | De Lutiis et al. | |
| 2012/0295592 A1* | 11/2012 | Peirce | ............ G07C 5/085 |
| | | | 455/414.1 |
| 2015/0081201 A1* | 3/2015 | Rubin | ............ G01C 21/26 |
| | | | 701/301 |
| 2016/0264071 A1* | 9/2016 | Ujiie | ............ H04L 9/3242 |

(Continued)

FOREIGN PATENT DOCUMENTS

| | | | |
|---|---|---|---|
| CN | 103569050 A | | 2/2014 |
| CN | 106411443 A | * | 2/2017 |

(Continued)

*Primary Examiner* — Kambiz Zand
*Assistant Examiner* — Mahabub S Ahmed
(74) *Attorney, Agent, or Firm* — NORTON ROSE FULBRIGHT US LLP; Gerard A. Messina

(57) ABSTRACT

A method for operating a data communication between functional units for a vehicle, in which a predefined number of data packets transmitted by a sending unit to a receiving unit is collected in a data buffer of the sending unit to generate a data block. In each predefined time step, one data packet is transmitted, in which the data packets are collected over a predefined collection period. A signature for authenticating the data block is then determined, the signature being determined over a predefined determination period lasting for multiple time steps. The signature is then sent in multiple parts from the sending unit to the receiving unit over a predefined transmission period, with one part of the signature being sent per time step. The sum of the collection period, the determination period and the transmission period is less than a predefined system fault tolerance time.

20 Claims, 2 Drawing Sheets

(56) References Cited

U.S. PATENT DOCUMENTS

| | | | |
|---|---|---|---|
| 2017/0153282 A1* | 6/2017 | Du | G01R 31/52 |
| 2018/0229739 A1* | 8/2018 | Imamoto | B60W 50/04 |
| 2018/0314857 A1* | 11/2018 | Morita | H04L 9/12 |
| 2019/0018408 A1 | 1/2019 | Gulati et al. | |
| 2019/0173912 A1* | 6/2019 | Ujiie | H04L 12/40 |
| 2019/0281052 A1* | 9/2019 | Lekkas | H04L 9/14 |
| 2019/0342859 A1* | 11/2019 | Rubin | H04W 4/12 |
| 2020/0394341 A1* | 12/2020 | Bitton | H04L 63/1425 |
| 2021/0014254 A1* | 1/2021 | Weber | H04L 63/1425 |
| 2021/0075620 A1 | 3/2021 | Driscoll | |
| 2022/0123933 A1* | 4/2022 | Mondello | B60C 23/0462 |
| 2022/0246156 A1* | 8/2022 | Norvell | G10L 19/005 |
| 2023/0153099 A1* | 5/2023 | Ujiie | H04L 12/40006 |
| | | | 717/174 |
| 2023/0156472 A1* | 5/2023 | Kuemmel | H04L 63/12 |
| | | | 726/4 |
| 2024/0283646 A1* | 8/2024 | Dirnberger | H04L 9/14 |

FOREIGN PATENT DOCUMENTS

| | | | | |
|---|---|---|---|---|
| CN | 109495263 A | | 3/2019 | |
| CN | 115380289 A | * | 11/2022 | G06F 21/64 |
| DE | 102010042539 A1 | | 4/2012 | |
| KR | 20190029197 A | * | 3/2019 | |
| KR | 20220095503 A | * | 7/2022 | |

* cited by examiner

METHOD AND APPARATUS FOR OPERATING A SECURE DATA COMMUNICATION BETWEEN FUNCTIONAL UNITS FOR A VEHICLE

RELATED APPLICATION INFORMATION

The present application claims priority to and the benefit of German patent application no. 10 2021 128 434.1, which was filed in Germany on Nov. 2, 2021, the disclosure of which is incorporated herein by reference.

FIELD OF THE INVENTION

The present invention relates to a method for operating a secure data communication between functional units for a vehicle, to a corresponding apparatus, to a functional unit for a vehicle, and to a corresponding computer program.

BACKGROUND INFORMATION

For example, to implement cyber security traditional data communication protocols require that every message exchanged between units must be signed. The more messages to be transmitted per unit time, the higher the demand on resources. For example, for a CAN message with 8 bytes of user data, a 16-byte signature is created when using the common AES128 encryption. This will triple the amount of data to be transmitted. Even if only part of the signature is transmitted, a doubling of the amount of data is still a realistic prospect.

SUMMARY OF THE INVENTION

Against this background, the object of the present invention is to create an improved method for operating a data communication between functional units for a vehicle, an improved apparatus for operating a data communication between functional units for a vehicle, an improved functional unit for a vehicle, and an improved computer program.

This object is achieved by a method for operating a data communication between functional units for a vehicle, by an apparatus for operating a data communication between functional units for a vehicle, by a functional unit for a vehicle and by a computer program according to the independent claims.

In accordance with embodiments, in particular, a data communication between functional units for a vehicle can be operated according to a communication protocol for message-authenticated communication, wherein a normal data communication, for example of a sensor signal, can be separated from the calculation, transmission and optional checking of an associated signature. Data communication can be used, for example, in communication between control units and additionally or alternatively for sensor communication. According to embodiments, in particular the time window of the system fault tolerance time can be used to collect data or data packets over a period of time, to determine a common signature for the collected data and to transmit it.

In particular, according to embodiments a resource-efficient communication protocol for message-authenticated communication can be provided. If, for example, according to embodiments not every message, i.e. every data packet, is individually protected by a signature, then computational effort for calculating the signature and transmission effort for sending the signature can be saved for each message. Thus, in particular, the process can comply with the limits of existing resources, e.g. transmission capacity, computing power, etc. Unlike traditional protocols that use an individual signature for each transmitted message to be able to immediately detect an attack, wherein a recipient can detect the attack after receiving a message, according to some embodiments, for example, it is possible to exploit the fact that in the automotive domain it is sufficient to detect a potential attack within a fault tolerance time of the system. According to some embodiments, this additional period of the system fault tolerance time in particular can be exploited to reduce the resources required for the signature.

A method for operating a data communication between functional units for a vehicle is presented, the method comprising the following steps:

collecting a predefined number of data packets transmitted by a sending unit to a receiving unit in a data buffer of the sending unit to generate a data block, wherein one data packet is transmitted in each predefined time step, the data packets being collected over a predefined collection period that lasts for the sum of the time steps of the predefined number of data packets of the data block;

determining a signature to authenticate the data block, wherein the signature is determined over a predefined determination period that lasts for multiple time steps; and sending the signature in multiple parts from the sending unit to the receiving unit over a predefined transmission period, one part of the signature being sent per time step, wherein the collecting step, the determining step and the sending step are carried out in such a way that the sum of the collection period, the determination period and the transmission period is less than a predefined system fault tolerance time.

The vehicle can be a motor vehicle, for example a passenger car, a heavy goods vehicle, or another utility vehicle. The functional units can comprise at least one sending unit and at least one receiving unit. A control unit or sensor of the vehicle may be configured as or function as a sending unit. In addition, another control unit or another sensor on the vehicle may be configured as or function as a receiving unit. The sending unit and receiving unit can be connected or connected to each other over a data transmission channel. Each data packet can represent sensor data, control data or the like. For example, a control signal, a sensor signal or the like can be divided into the data packets and transmitted. The method can also comprise a step of transmitting the predefined number of data packets to a receiving unit. The system fault tolerance time can be given by specifications of the data communication, a data transmission path, and additionally or alternatively, one or more of the functional units. The time window of the system fault tolerance time can be defined by how long a system can tolerate a potential attack without reaching a safety-critical state. For example, it may be tolerable for a signal change of a sensor to be suppressed by an attack for up to 300 milliseconds if the attack can be detected and the system brought to a secure state within this time window. Disruptions in the data communication itself can be detected by end-to-end protection measures independent of message authentication.

According to one embodiment the collecting step, the determining step and the sending step can be carried out in such a way that the sum of the collection period and the determination period is less than or equal to a sum of the determination period and the transmission period. Such an embodiment offers the advantage that a response time to a potential attack can be adapted to the given system fault tolerance time by dimensioning the number of time steps of the collection period, determination period and transmission period.

Also, the collecting step, the determining step and the sending step can be carried out in such a way that the sum of the determination period and the transmission period is less than twice the collection period. Such an embodiment offers the advantage that a response time to a potential attack can be adapted to the given system fault tolerance time by dimensioning the number of time steps of the collection period, determination period and transmission period.

In addition, the determining step and the sending step can be carried out in such a way that the determination period and the transmission period are the same length. Such an embodiment offers the advantage that a response time to a potential attack can be adapted to the given system fault tolerance time by dimensioning the number of time steps of collection period, determination period and transmission period.

In addition, the determining step and the sending step can be carried out in such a way that the determination period and the transmission period are of different lengths. Such an embodiment offers the advantage that a response time to a potential attack can be adapted to the given system fault tolerance time by dimensioning the number of time steps of the collection period, determination period and transmission period.

Also, the collecting step, the determining step and the sending step can be carried out in such a way that the determination period is no longer than the collection period and additionally or alternatively, the transmission period is no longer than the collection period. Such an embodiment offers the advantage that a response time to a potential attack can be adapted to the given system fault tolerance time by dimensioning the number of time steps of the collection period, determination period and transmission period.

According to one embodiment, the signature for a previously transmitted data block and the current data block can be sent together in the sending step. In this case, a part of the signature can be sent interlaced together with at least one of the data packets of the data blocks. Such an embodiment offers the advantage that even a so-called replay attack can be detected within the transmission period plus the period required to verify the signature in the receiver. The period of time between the creation of the data and the authentication of the data in the receiver is not affected and remains unchanged. Despite the joint transmission of data and signature, these two elements can be temporally decoupled. The signature can be provided for a previously sent data block. This allows a message to be sent, making it more difficult for an attacker to manipulate only part of it, such as the useful data.

The signature and a data packet can be sent in the sending step, wherein one part of the signature defined over the data block can be sent together with a data packet per time step.

The collecting step, the determining step and the sending step can also be carried out repeatedly in a cyclical manner. In this case additional data packets can be collected over a predefined additional collection period in order to generate an additional data block, wherein an additional signature can be determined over a predefined additional determination period for authenticating the additional data block, wherein during a predefined additional transmission period, the additional signature can be sent from the sending unit to the receiving unit in multiple parts. In other words, in the case of a cyclical, repeated execution, in the collecting step additional data packets can be collected over a predefined additional collection period in order to generate an additional data block, in the determining step a further signature can be determined for authenticating the additional data block over a predefined additional determination period, and in the sending step the additional signature can be sent from the sending unit to the receiving unit in multiple parts during a predefined additional transmission period. The collecting step, the determining step and the sending step can be executed in series, serially or sequentially. Such an embodiment offers the advantage that an efficient authentication of any amount of data can be realized.

According to one embodiment, the collecting step, the determining step and the sending step can be executed in such a way that the additional collection period directly follows the collection period, and additionally or alternatively the further collection period temporally overlaps the determination period and additionally or alternatively partially overlaps the transmission period. Alternatively, the additional collection period can follow the collection period after an intervening period. If two periods temporally overlap or partially overlap, this means that an overlapping time range exists in which both periods are running in parallel. Such an embodiment offers the advantage that the steps of the method can also be executed at least partly in parallel, wherein different data blocks can therefore be processed.

In addition to the above-mentioned transmitter-side steps, which can be executed at the sending unit end, the method can also include receiver-side steps that can be executed at the receiving unit end. After the signature has been transmitted, the receiving unit can determine the authenticity of a group of received data packets, that is, the data block. To do this, the receiving unit can buffer received data packets until the signature has been sent. The data packets received in the interim can be used safely, provided that the signature can be checked and countermeasures for a detected attack can be executed within the system fault tolerance time.

The approach presented here also creates an apparatus that is configured to carry out, to control and/or implement the steps of an alternative configuration of a method presented here in corresponding devices. Also by this alternative approach in the form of an apparatus, the underlying object of the invention can be achieved quickly and efficiently.

For this purpose, the apparatus can comprise at least one processing unit for processing signals or data, at least one storage unit for storing signals or data, at least one interface to a sensor or an actuator for reading in sensor signals from the sensor or for outputting data or control signals to the actuator, and/or at least one communication interface for reading in or outputting data that is embedded in a communication protocol. The processing unit can be, for example, a signal processor, a microcontroller or the like, wherein the storage unit can be a volatile memory, a flash memory, an EEPROM or a magnetic storage unit. The communication interface can be configured to read in or output data by wireless and/or cable-based arrangement or structure, wherein a communication interface which can read in or output cable-based data can read in this data, for example, by electrical or optical arrangement or structure from an appropriate data transmission line or can output this data into an appropriate data transmission line.

An apparatus as used here can be understood to mean an electrical device which processes sensor signals and outputs control and/or data signals depending on them. The apparatus can have an interface, which can be implemented in hardware and/or software. In the case of a hardware-based configuration, the interfaces can be, for example, part of a so-called system-ASIC, which includes the wide range of functions of the apparatus. It is also possible, however, that the interfaces are dedicated integrated circuits, or at least in part consist of discrete components. In the case of a software-based configuration, the interfaces can be software modules which exist, for example, on a microcontroller in addition to other software modules.

A functional unit for a vehicle is also presented, wherein the functional unit is embodied as an apparatus referred to herein, wherein the functional unit is configured as a control unit or as a sensor or as an actuator.

The functional unit can be mountable or mounted in the vehicle or, in other words, configured as a part of the vehicle. The vehicle may comprise at least one functional unit that is configured in the form of the apparatus referred to herein.

Also advantageous is a computer program product or computer program with program code, which can be stored on a machine-readable medium or storage medium, such as a semiconductor memory, a hard drive or an optical storage device and is used to carry out, implement and/or control the steps of the method according to any one of the embodiments described above, in particular when the program product or program is executed on a computer or an apparatus.

Exemplary embodiments of the approach presented here are explained in more detail in the following description with reference to the figures.

DETAILED DESCRIPTION

Figure 1:
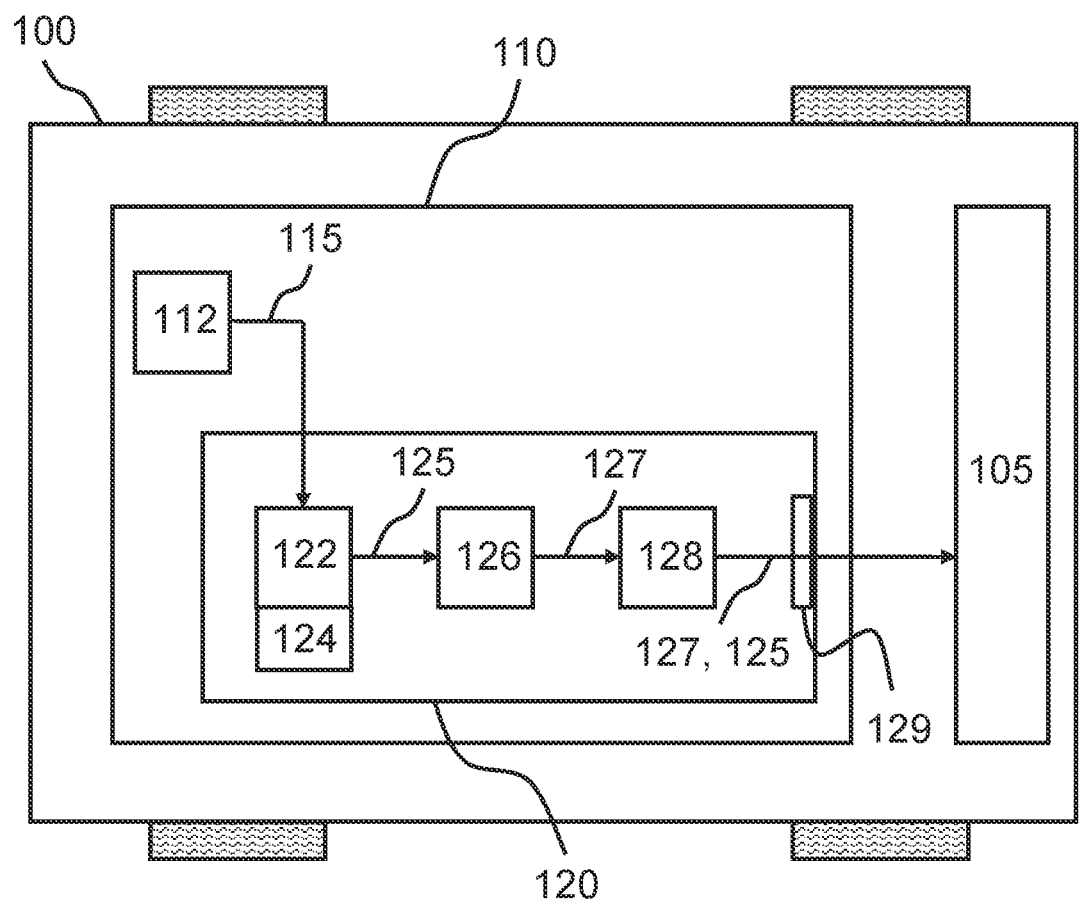
FIG. 1 shows a schematic illustration of a vehicle having functional units and an exemplary embodiment of an apparatus for operating a data communication.

FIG. 1 shows a schematic illustration of a vehicle 100 having functional units 105, 110 and an exemplary embodiment of an apparatus 120 for operating a data communication. The vehicle 100 is a motor vehicle, for example a passenger car, a motorcycle, an e-bicycle, a heavy goods vehicle, or other utility vehicle. Of the vehicle 100, only one first functional unit 105 acting as a sending unit and one second functional unit 110 acting as a receiving unit are shown in the example illustration in FIG. 1. The first functional unit 105 is configured, for example, as a control unit or as a sensor. The second functional unit 110 is configured, for example, as a control unit or as a sensor. The first functional unit 105 and the second functional unit 110 are connected to each other over a data transmission channel.

The second functional unit 110 has an apparatus 120 for operating a data communication between the functional units 105 and 110. The apparatus 120 comprises a collecting device 122, a data buffer 124, a determining device 126, and a sending device 128. The second functional unit 110 also has a transmitting device 112. The transmitting device 112 is configured to send data packets 115 via the apparatus 120 to the first functional unit 105 acting as the receiving unit. The transmitting device 112 is configured to transmit a data packet 115 in each predefined time step. The data packets 115 are, for example, sections of a control signal, a sensor signal, or the like.

The collecting device 122 of the apparatus 120 is configured to collect a predefined number of transmitted data packets 115 in the data buffer 124 in order to generate a data block 125. The collecting device 122 is configured to collect the data packets 115 over a predefined collection period that lasts for the sum of the time steps of the predefined number of data packets 115 of the data block 125. In other words, the collection period comprises a number of time steps which is equal to the predefined number of data packets. The predefined number of data packets 115 from which the data block 125 is generated is determined by the size of the data buffer 124. The data block 115 generated from the collected data packets 115 comprises the individual transmitted messages or data packets 115, for example when a new sensor signal is available.

The determining device 126 of the apparatus 120 is configured to determine a signature 127 for authenticating the data block 125. The determining device 126 is configured to determine the signature 127 over a predefined determination period that lasts for multiple time steps. For example, the determining device 126 is configured to use a determination rule to determine the signature 127.

The sending device 128 of the apparatus 120 is configured to send the signature 127 to the receiving unit 105 in multiple parts over a predefined transmission period via an interface 129 of the apparatus 120. The sending device 128 is configured to send one part of the signature 127 per time step.

The collecting device 122, the determining device 126 and the sending device 128 are configured to set the collection period, the determination period and the transmission period in such a way that a sum of the collection period, the determination period and the transmission period is less than a predefined system fault tolerance time.

According to one exemplary embodiment, the sending device 128 is configured to send the signature 127 and the data block 125. The sending device 128 is configured to send one part of the signature 127 together with at least one of the data packets 115 of the data block 125 per time step.

Figure 2:
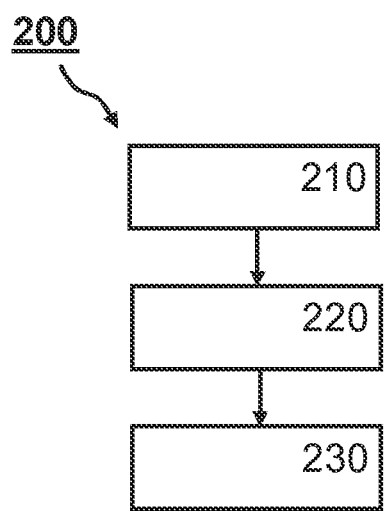
FIG. 2 shows a flowchart of an exemplary embodiment of a method for operating a data communication between functional units parameter for a vehicle.

FIG. 2 shows a flowchart of an exemplary embodiment of a method 200 for operating a data communication between functional units for a vehicle. The operating method 200 can be carried out in conjunction with or by using the apparatus of FIG. 1 or a similar apparatus. The operating method 200 comprises a collecting step 210, a determining step 220, and a sending step 230.

In the collecting step 210, a predefined number of data packets transmitted from a sending unit to a receiving unit is collected or buffered in a data buffer of the sending unit in order to generate a data block. One data packet is sent in each predefined time step. The data packets are collected over a predefined collection period that is equal to the sum of the time steps of the predefined number of data packets in the data block. In the determining step 220, a signature for authenticating the data block is then determined. The signature is determined over a predefined determination period that lasts for multiple time steps. In turn, in the sending step 230 the signature is then sent from the sending unit to the receiving unit in multiple parts over a predefined transmission period. One part of the signature is sent per time step.

The collecting step 210, the determining step 220 and the sending step 230 are carried out in such a way that the sum of the collection period, the determination period and the transmission period is less than a predefined system fault tolerance time for the data communication.

Figure 3:
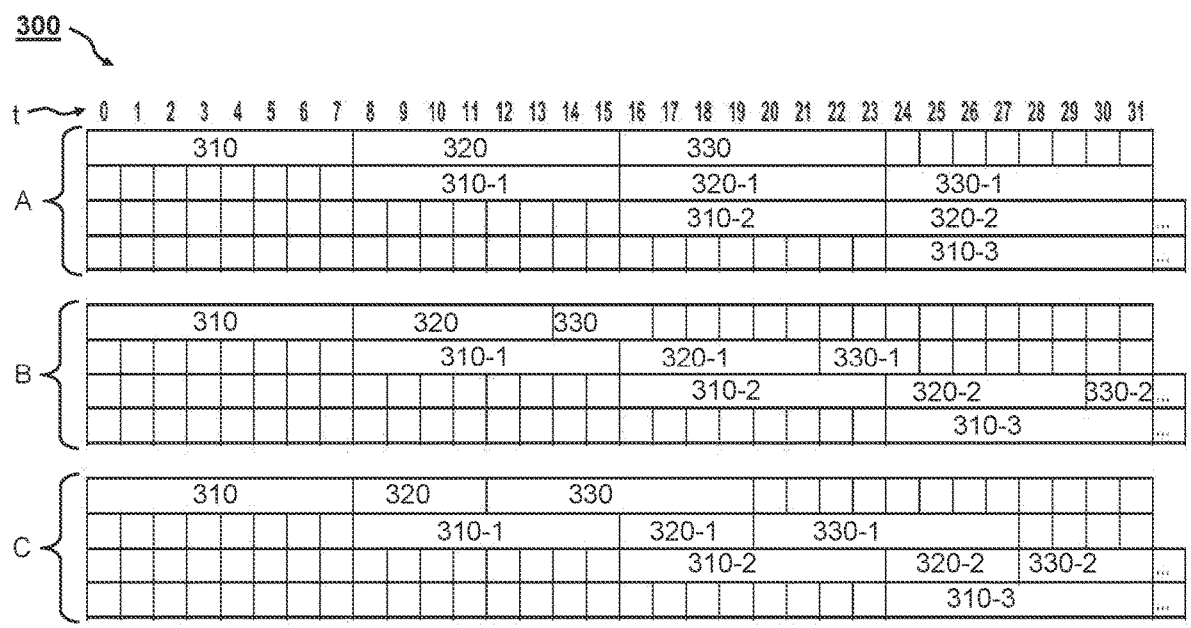
FIG. 3 shows a schematic timing sequence diagram for the method of FIG. 2.

FIG. 3 shows a schematic timing sequence diagram 300 for the method in FIG. 2 or a similar method. A first example A, a second example B and a third example C are shown for a temporal sequence of the execution of the steps of the method in FIG. 2 along a time axis on which the predefined time steps t, for example 10 ms, are plotted, with only a first time step 0 to a thirty-second time step 31 being shown. For each of the examples A to C, the collection period 310, the determination period 320 and the transmission period 330 as well as further collection periods 310-1, 310-2, 310-3, further determination periods 320-1, 320-2 and further transmission periods 330-1, 330-2 of different, consecutive iterations of a repeated execution of the method steps are shown.

In particular, in all examples A to C, the collection periods 310, 310-1, 310-2, 310-3 are the same length with, purely as an example, 8 time steps t.

For the method in FIG. 2, and thus for the examples A to C in FIG. 3, the following also applies: the collecting step, the determining step and the sending step can be repeated cyclically, in particular repeated multiple times, wherein over a predefined further collection period 310-1/310-2/310-3 additional data packets are collected in order to generate an additional data block, wherein an additional signature 127 for authenticating the additional data block is determined over a predefined further determination period 320-1/320-2, wherein the additional signature is sent in multiple parts from the sending unit to the receiving unit during a predefined additional transmission period 330-1/330-2. According to the exemplary embodiment shown here, the method steps are executed using time periods that remain constant over the different iterations of the repeated execution.

In this case, the collecting step, the determining step and the sending step can be executed in such a way that the further collection period 310-1 directly follows the collection period 310 or the message data collection time window. Also, the collecting step, the determining step and the sending step can be executed in such a way that the further collection period 310-1 temporally overlaps the determination period 320 or a signature determination time window, for example between the ninth and the sixteenth time step in the first example A, between the ninth and the fourteenth time steps in the second example B and between the ninth and twelfth time steps in the third example C, and optionally also partially temporally overlaps the transmission period 330 or a signature transmission time window, for example between the fifteenth and the sixteenth time step in the second example B and between the thirteenth and sixteenth time steps in the third example C. The collecting step, the determining step and the sending step can also be carried out in such a way that a sum of the collection period 310 and the determination period 320 is less than or equal to a sum of the determination period 320 and the transmission period 330. The collecting step, the determining step and the sending step can also be carried out in such a way that the sum of the determination period 320 and the transmission period 330 is less than twice the collection period 310. Furthermore, the collecting step, the determining step and the sending step can be carried out in such a way that the determination period 320 is no longer than the collection period 310 and/or the transmission period 330 is no longer than the collection period 310. The statements in this paragraph also apply accordingly for the respective durations of other cycles of the repeated execution of the method steps.

In addition, for the example A in FIG. 3, the determining step and the sending step can be carried out in such a way that the determination period 320 and the transmission period 330 are the same length. In addition, the collection period 310, the determination period 320 and the transmission period 330 are the same length. Similarly, for the duration of other iterations of the repeated execution of the method steps, according to the first example A all durations are the same length.

For the second example B and the third example C in FIG. 3, the determining step and the sending step can be carried out in such a way that the determination period 320 and the transmission period 330 are of different lengths. In the case of the second example B, the determination period 320 with 6 time steps t is longer than the transmission period 330 with 3 time steps t. In the case of the third example C, the determination period 320 with 4 time steps t is shorter than the transmission period 330 with 8 time steps t. The same applies equally to the periods of other cycles of the repeated execution of the method steps.

With reference to the figures described above, in the following, exemplary embodiments and advantages of exemplary embodiments will be briefly summarized and/or explained once again in other words.

As is known, the transmission or communication of the sensor signal in the form of the data packets 115 by the transmission device 112 takes place cyclically in each time step, e.g. every 10 ms with a checksum, for example as recommended in ISO26262. To authenticate the transmitted data packets 115, the following steps are carried out over a period of several time steps t:

1. The transmitted sensor values or data packets 115 are additionally collected in a data buffer 124.

2. When the data buffer 124 is filled, the signature 127 is determined or calculated again over the data packets 115 of the data block 125, distributed over multiple time steps t.

3. The signature 127 is sent to the receiver in a piecewise manner, also distributed over multiple time steps t. This procedure is configured in such a way that the above-mentioned three steps can be carried out serially over multiple time steps t as well as in parallel within one time step t, with reduced resource requirements. See also the first example A in FIG. 3. This means that—always in parallel—a data buffer 124 is filled, the signature 127 is determined over the content of a previously filled data buffer 124, i.e. the data block 125, and a signature 127 is sent. By dimensioning the number of time steps t for buffering the data or collecting the data packets 115, for calculating the signature or for determining the signature 127 and for sending the signature 127, the response time to an attack can be adapted to the fault tolerance time of the system, see also, for example, the second example B and the third example C in FIG. 3.

In particular in order to shorten the detection time of a simple replay attack, according to an exemplary embodiment the signature 127 with the data to be protected, i.e. the data packets 115 of the data block 125, can be sent together, or in the same message. The detection time for replay attacks is then the same length as the transmission period 330 plus the time needed for checking the signature in the receiver. The detection time for unauthenticated data is the same length as the sum of the collection period 310, the determination period 320 and the transmission period 330.

For example, according to exemplary embodiments, in comparison to MAC (Message Authentication Code) in particular only a fraction of the computing and transmission capacity is required, corresponding to the ratio between the cyclical message transmission and the amount of data collected. For example, if 8 data packets of sensor data are signed together, the resource requirement is reduced by a factor of 8 compared to an individual signature of each data packet. This makes it possible to reliably meet the requirements on authenticated communication imposed by cyber security, even with low-cost control units and low-performance communication links, e.g. serial communication, SENT, PSI, etc. It is also possible to avoid using more expensive and/or error-prone communication buses, such as CAN-FD or Ethernet, in order to be able to transmit the additional signature data.

A possible saving of computing and transmission capacity by exemplary embodiments will also be briefly explained using the example of an intelligent sensor of a vehicle. For example, a low-cost, slowly-clocked 16-bit microcontroller is used for sensor data preparation and a robust serial interface with low transmission speed is used for sensor data transmission. In this case, a task cycle time t for the preparation and transmission of the sensor data is 10 ms, for example. Without data buffering or data collection and with an AES 128 signature, where sensor data is prepared every 10 ms, the calculation of the signature in software takes 2.5 ms and thus generates 25% CPU load, while a bus load of 83% is obtained for transmission of the signature with full MAC or a bus load of 20% for partial MAC with restricted authentication. According to the first example A from FIG. 3, with data buffering or data collection and also with an AES 128 signature 127 for eight sensor values together, i.e. 8 task cycle times, with the sensor value being recorded every 10 ms, the following results are obtained: the determination of the signature 127 takes only 2.5 ms/8=0.3 ms per time step t with a generated CPU load of 3%, while for sending the signature 127 per time step t a bus load of 83%/8 =10% is obtained with a fully transmitted MAC.

THE List OF REFERENCE SIGNS IS AS FOLLOWS

100 vehicle
105 first functional unit
110 second functional unit
112 transmitting device
115 data packets
120 apparatus
122 collecting device
124 data buffer
125 data block
126 determining device
127 signature
128 sending device
129 interface
200 method for operating
210 collecting step
220 determining step
230 sending step
300 timing sequence diagram
310 collection period
320 determination period
330 transmission period
310-1, 310-2, 330-3 additional collection period
320-1, 310-2 additional determination period
330-1, 330-2 additional transmission period
A first example
B second example
C third example
t time steps

What is claimed is:

1. A method for operating a data communication between functional units for a vehicle, the method comprising:
   collecting a predefined number of data packets transmitted by a sending unit to a receiving unit in a data buffer of the sending unit to generate a data block, wherein one data packet is transmitted in each predefined time step, the data packets being collected over a predefined collection period that lasts for the sum of the time steps of the predefined number of data packets of the data block;
   determining a signature to authenticate the data block, wherein the signature is determined over a predefined determination period that lasts for multiple time steps; and
   sending the signature in multiple parts from the sending unit to the receiving unit over a predefined transmission period, one part of the signature being sent per time step;
   wherein the collecting step, the determining step and the sending step are carried out so that the sum of the collection period, the determination period and the transmission period is less than a predefined system fault tolerance time.

2. The method of claim 1, wherein the collecting step, the determining step and the sending step are performed so that the sum of the collection period and the determination period is less than or equal to a sum of the determination period and the transmission period.

3. The method of claim 1, wherein the collecting step, the determining step and the sending step are performed so that the sum of the determination period and the transmission period is less than twice the collection period.

4. The method of claim 1, wherein the determining step and the sending step are performed so that the determination period and the transmission period are the same length.

5. The method of claim 1, wherein the determining step and the sending step are performed so that the determination period and the transmission period are of different lengths.

6. The method of claim 1, wherein the collecting step, the determining step and the sending step are performed so that the determination period is no longer than the collection period and/or the transmission period is no longer than the collection period.

7. The method of claim 1, wherein in the sending step the signature for a data block already sent and the current data block are sent together, and wherein one part of the signature, interlaced together with at least one of the data packets of the data block, is sent per time step.

8. The method of claim 1, wherein in the sending step the signature and a data packet are sent, and wherein one part of the signature determined over the data block is sent together with a data packet per time step.

9. The method of claim 1, wherein the collecting step, the determining step and the sending step are repeated cyclically, wherein over a predefined additional collection period additional data packets are collected to generate an additional data block, wherein an additional signature for authenticating the additional data block is determined over a predefined further determination period, and wherein the additional signature is sent in multiple parts from the sending unit to the receiving unit during a predefined additional transmission period.

10. The method of claim 9, wherein the collecting step, the determining step and the sending step are performed so that the further collection period directly follows the collection period and/or the further collection period temporally overlaps the determination period and/or partially temporally overlaps the transmission period.

11. An apparatus for operating a data communication between functional units for a vehicle, comprising:
a device configured to perform the following:
collecting a predefined number of data packets transmitted by a sending unit to a receiving unit in a data buffer of the sending unit to generate a data block, wherein one data packet is transmitted in each predefined time step, the data packets being collected over a predefined collection period that lasts for the sum of the time steps of the predefined number of data packets of the data block;
determining a signature to authenticate the data block, wherein the signature is determined over a predefined determination period that lasts for multiple time steps; and
sending the signature in multiple parts from the sending unit to the receiving unit over a predefined transmission period, one part of the signature being sent per time step;
wherein the collecting step, the determining step and the sending step are carried out so that the sum of the collection period, the determination period and the transmission period is less than a predefined system fault tolerance time.

12. A functional unit for a vehicle, comprising:
an apparatus for operating a data communication between functional units of the vehicle, including a device configured to perform the following:
collecting a predefined number of data packets transmitted by a sending unit to a receiving unit in a data buffer of the sending unit to generate a data block, wherein one data packet is transmitted in each predefined time step, the data packets being collected over a predefined collection period that lasts for the sum of the time steps of the predefined number of data packets of the data block;
determining a signature to authenticate the data block, wherein the signature is determined over a predefined determination period that lasts for multiple time steps; and
sending the signature in multiple parts from the sending unit to the receiving unit over a predefined transmission period, one part of the signature being sent per time step;
wherein the collecting step, the determining step and the sending step are carried out so that the sum of the collection period, the determination period and the transmission period is less than a predefined system fault tolerance time, and
wherein the functional unit includes a control unit, or a sensor, or an actuator.

13. A non-transitory computer readable medium having a computer program, which is executable by a processor, comprising:
a program code arrangement having program code for operating a data communication between functional units of a vehicle, by performing the following:
collecting a predefined number of data packets transmitted by a sending unit to a receiving unit in a data buffer of the sending unit to generate a data block, wherein one data packet is transmitted in each predefined time step, the data packets being collected over a predefined collection period that lasts for the sum of the time steps of the predefined number of data packets of the data block;
determining a signature to authenticate the data block, wherein the signature is determined over a predefined determination period that lasts for multiple time steps; and
sending the signature in multiple parts from the sending unit to the receiving unit over a predefined transmission period, one part of the signature being sent per time step;
wherein the collecting step, the determining step and the sending step are carried out so that the sum of the collection period, the determination period and the transmission period is less than a predefined system fault tolerance time.

14. The non-transitory computer readable medium of claim 13, wherein the collecting step, the determining step and the sending step are performed so that the sum of the collection period and the determination period is less than or equal to a sum of the determination period and the transmission period.

15. The non-transitory computer readable medium of claim 13, wherein the collecting step, the determining step and the sending step are performed so that the sum of the determination period and the transmission period is less than twice the collection period.

16. The non-transitory computer readable medium of claim 13, wherein the determining step and the sending step are performed so that the determination period and the transmission period are the same length.

17. The non-transitory computer readable medium of claim 13, wherein the determining step and the sending step are performed so that the determination period and the transmission period are of different lengths.

18. The non-transitory computer readable medium of claim 13, wherein the collecting step, the determining step and the sending step are performed so that the determination period is no longer than the collection period and/or the transmission period is no longer than the collection period.

19. The non-transitory computer readable medium of claim 13, wherein in the sending step the signature for a data block already sent and the current data block are sent together, and wherein one part of the signature, interlaced together with at least one of the data packets of the data block, is sent per time step.

20. The non-transitory computer readable medium of claim 13, wherein in the sending step the signature and a data packet are sent, and wherein one part of the signature determined over the data block is sent together with a data packet per time step.

* * * * *